United States Patent [19]

Ancona et al.

[11] Patent Number: 5,083,734

[45] Date of Patent: Jan. 28, 1992

[54] HOLDER FOR A GRATER OR THE LIKE

[75] Inventors: Bruce Ancona; Jane Ancona, both of New York City, N.Y.

[73] Assignee: M. Kamenstein, Inc., White Plains, N.Y.

[21] Appl. No.: 613,022

[22] Filed: Nov. 19, 1990

[51] Int. Cl.⁵ .............................................. F16M 11/00
[52] U.S. Cl. .................................. 248/176; 241/101.2; 241/273.1; 241/285 A; 248/687
[58] Field of Search .................. 248/687, 176, 37.3, 248/146, 147, 154; 241/273.1, 273.2, 273.3, 273.4, 101.2, 285 R, 285 A, 101.3, 168, 95; 269/289 R; D7/678; 83/703, 707; 99/537; 222/80, 89, 90; 220/306, 663

[56] References Cited

U.S. PATENT DOCUMENTS

| | | | |
|---|---|---|---|
| 303,422 | 8/1884 | De Long | 220/663 |
| 564,595 | 7/1896 | Cunningham | 241/101.2 X |
| 564,656 | 7/1896 | Sobey | 241/273.1 |
| 857,336 | 6/1907 | Fallon, Jr. | 241/285 X |
| 1,890,000 | 12/1932 | Oakley | 248/687 |
| 2,087,101 | 7/1937 | Cerracchio | 241/285 X |
| 2,615,486 | 10/1952 | Marcus | 241/273.1 X |
| 3,583,455 | 6/1971 | Ostrowsky | 241/273.2 X |
| 3,589,421 | 6/1971 | Locker | 241/273.1 X |
| 3,698,460 | 10/1972 | Ashton et al. | 241/273.1 |
| 4,538,731 | 9/1985 | Cillario | 220/306 X |
| 4,546,928 | 10/1985 | Suzuki | 241/273.2 X |
| 4,928,893 | 5/1990 | Prindle | 241/273.2 X |

*Primary Examiner*—David L. Talbott
*Attorney, Agent, or Firm*—James A. Drobile; Robert A. Koons, Jr.; Robert E. Rosenthal

[57] ABSTRACT

A holder for grater boards and the like includes a hollow body having a top wall, a bottom wall, a side wall, and an interior partition wall, the side wall, the bottom wall and the partition wall defining a main chamber having an opening in one side thereof, a planar surface formed in the side wall of the body opposite to the opening, elements on the edges of the opening for removably securing a grater board over the opening, a handle in an upper portion of the hollow body, a rubber foot attached to the exterior of the hollow body at the bottom thereof, and a window in the main chamber extending substantially the height thereof.

7 Claims, 4 Drawing Sheets

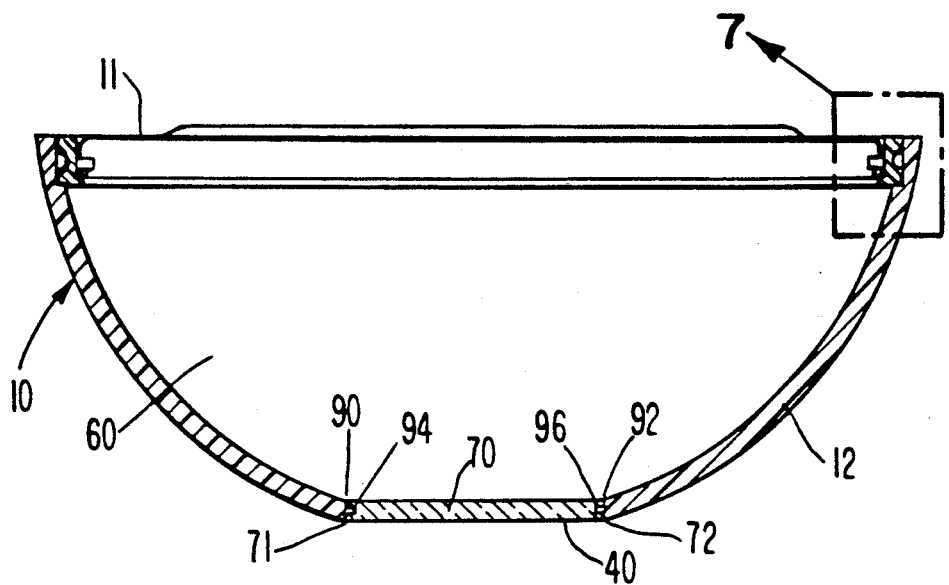
Fig. 6
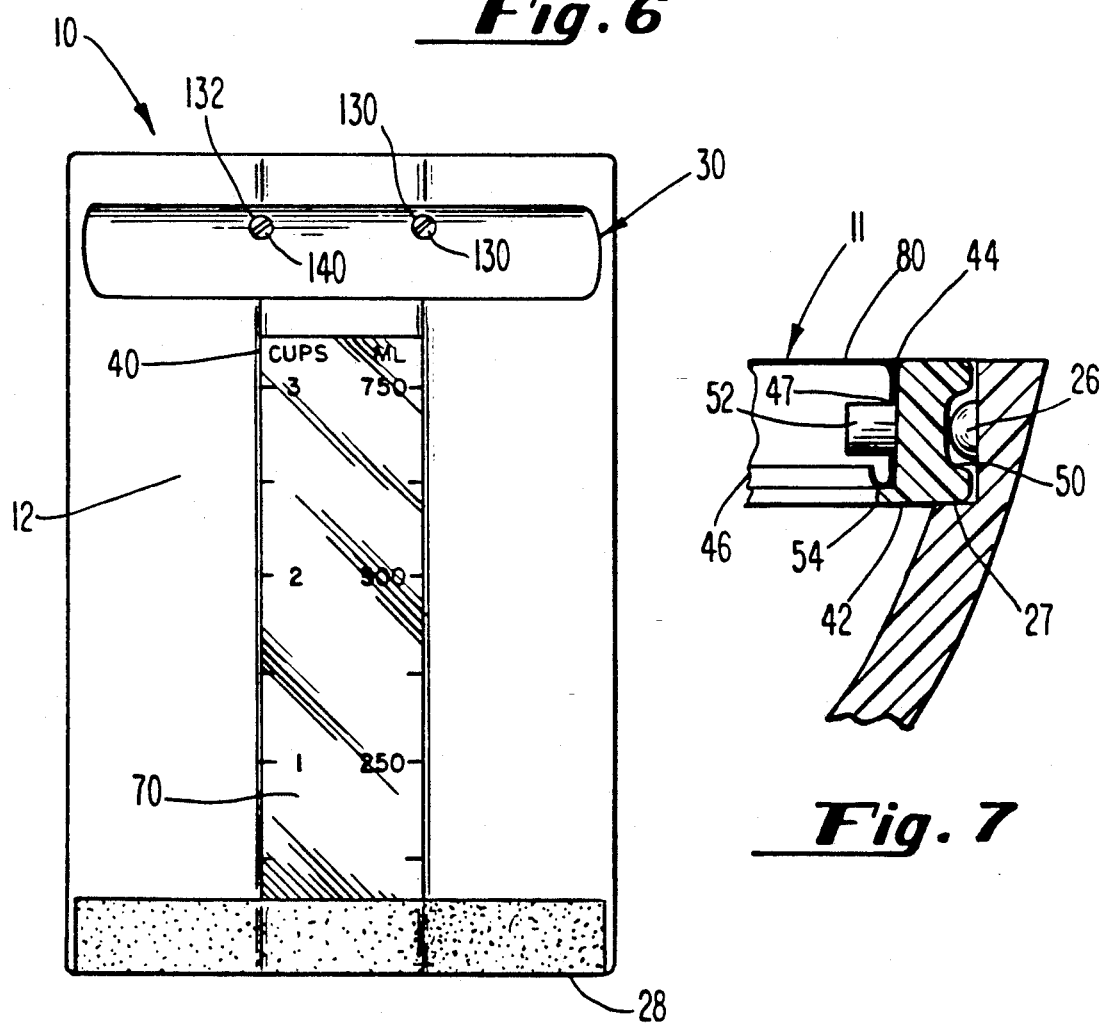
Fig. 5
Fig. 7

HOLDER FOR A GRATER OR THE LIKE

BACKGROUND OF THE INVENTION

This invention relates to the field of kitchen utensils. This invention relates more particularly to holders for graters or similar utensils made from substantially flat sheets of metal.

It is well known that useful kitchen implements may be provided from substantially flat sheets of metal having apertures therein with sharpened protrusions. For example, graters for cheese, vegetables, or other foods, may be made from flat sheets of metal. It is also known to use hard plastic for these utensils. These sheets, whether plastic or metal, are commonly referred to as "boards." When such graters or slicers are used, small grated pieces or slices fall on the opposite side of the sheet from the block of cheese, or piece of vegetable, or the like, that is being grated. When these pieces are allowed to fall on a flat surface, it will usually be difficult to transfer them to a bowl or plate without some loss of material. Moreover, pieces may be spilled on the floor. In either case, food is wasted, and time is wasted in cleaning spilled food from the floor and work surfaces.

A further problem in the use of graters, slicers and the like, is maintaining the stability of such graters while holding them. A certain amount of force is necessarily applied to the cheese or vegetable that is being grated. This force is transferred to the grater, which then must be held in place. It is difficult to hold such a grater in place over a bowl or other receptacle. Even if a surface, such as a kitchen counter, is available on which to rest a grater, a grater made of metal or hard plastic will easily slide across the surface. When the grater slides, of course, there is the danger of knocking pieces of grated food onto the floor. Again, food is wasted, and additional time is required for cleanup. In addition, if the grater slides, the hand of a person using the grater may come in contact with the sharpened protrusions. When this happens, the user may be cut.

A still further problem is accurately estimating the amount of grated material produced. It is desirable to grate no more than a desired quantity, so as to reduce waste.

OBJECTS OF THE INVENTION

It is accordingly an object of this invention to provide a holder for graters or the like that prevents small particles of grated food from being spilled or scattered.

It is further object of this invention to provide a holder for graters or the like that will not slide when being rested on a smooth surface.

It is a still further object of this invention to provide a holder for graters or the like having a window affording a view of the quantity of material therein.

Additional objects and advantages of the invention will become apparent from the detailed description of a preferred embodiment which follows.

SUMMARY OF THE INVENTION

A holder for a grater board has a hollow body having a top wall, a bottom wall, a side wall, and an interior partition wall, the side wall, the bottom wall, and the partition wall defining a main chamber having an opening in one side thereof, the side wall having a planar portion substantially opposite to the opening, securing means for removably securing a grater board to the hollow body over the opening, a foot made of a material having a high coefficient of friction on a lower portion of an outer surface of the side wall of the hollow body, a handle integrally formed in an upper portion of the hollow body for an individual to grip the holder, and a window in the main chamber extending substantially the height thereof.

BRIEF DESCRIPTION OF THE FIGURES

FIG. 5 is a bottom view of a holder for a grater or the like with reference to FIG. 1.

FIG. 6 is a sectional view of a holder for a grater or the like taken along line 6—6 of FIG. 1.

FIG. 7 is an enlarged view of the box marked "7" in FIG. 6.

DETAILED DESCRIPTION OF A PREFERRED EMBODIMENT

Figure 1:
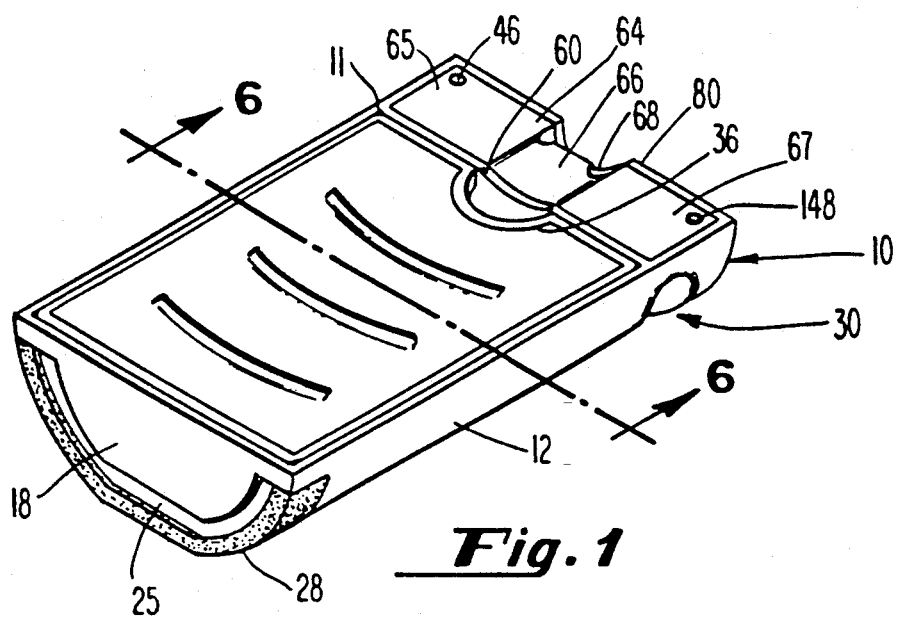
FIG. 1 is a perspective view of a holder for a grater or the like according to the invention.

With reference to the Figures, there is depicted a holder for a grater or the like in accordance with the invention. In this description, the top of the holder is to the upper right in FIGS. 1 and 2, and to the top of the page in FIGS. 4 and 5.

The holder is generally designated 10. A board 11, which may be used with the invention, is depicted. The board is designed for slicing, but many other types of boards may be used in accordance with the invention.

It will be seen that the holder 10 has a side wall 12, bottom wall 18, and top wall 80. Side wall 12, bottom wall 18, and top wall 80 define a hollow body 19 having substantially the shape of one-half of a cylinder. A rectangular opening 13 is provided in main chamber 17 of hollow body 19.

Figure 2:
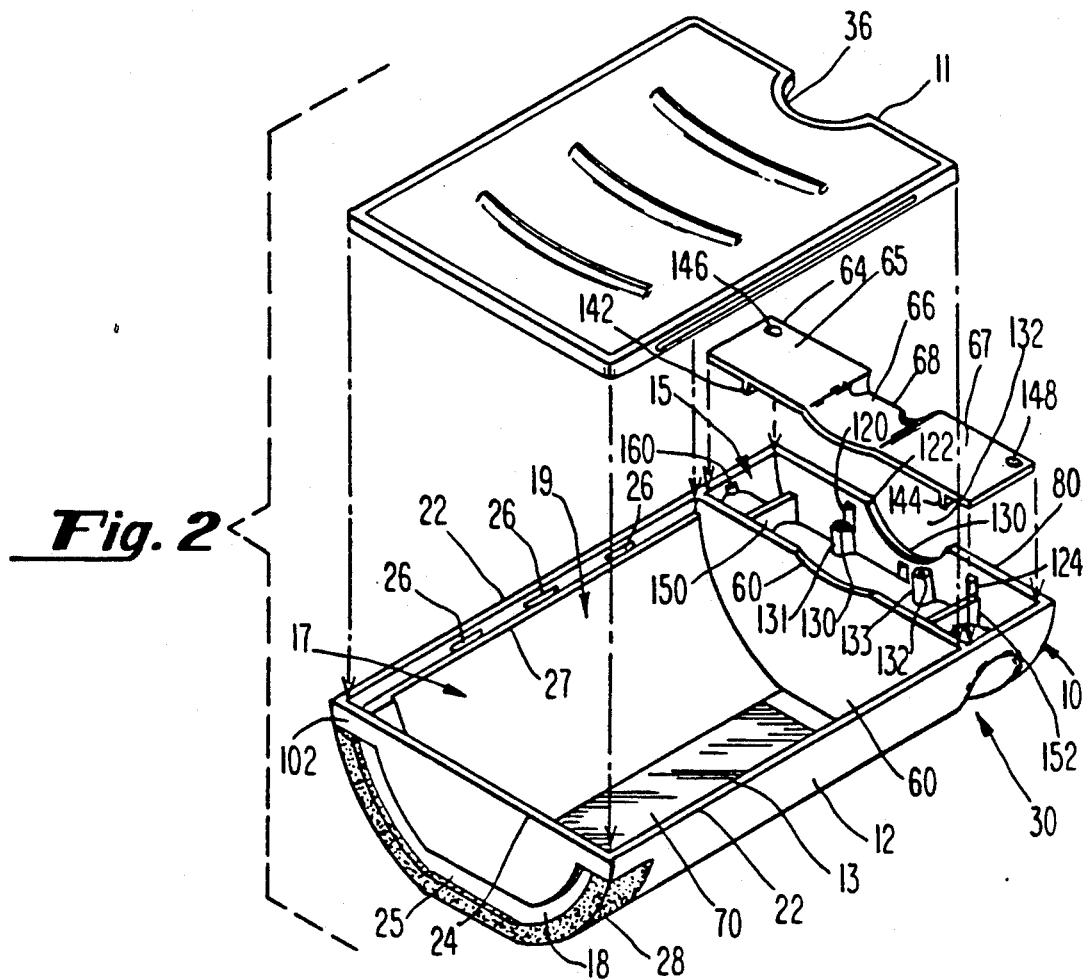
FIG. 2 is an exploded perspective view of the holder for a grater or the like of FIG. 1.

Referring to FIG. 2, a planar partition wall 60, substantially parallel to top wall 80 and bottom wall 18, divides hollow body 19 into a main chamber 17 and a top chamber 15.

Figure 3:
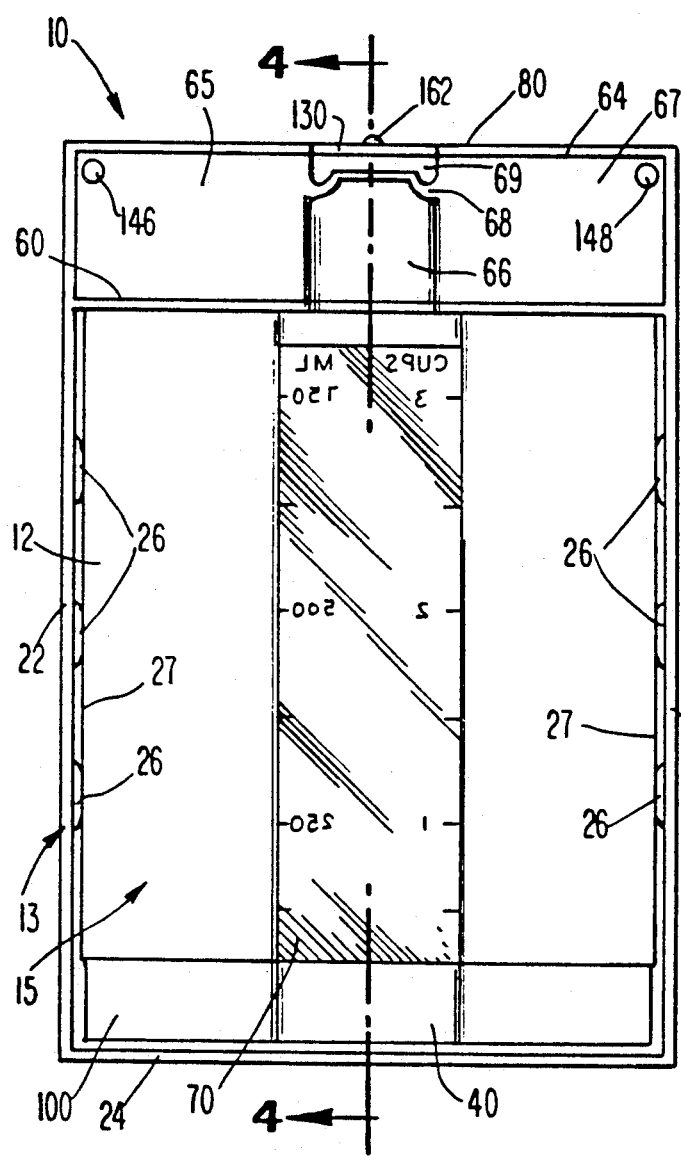
FIG. 3 is a top view of the holder for a grater or the like shown in FIG. 1.

A portion 40 of side wall 12 extending longitudinally along holder 10 is substantially flat, as may be seen best in FIGS. 3 and 6. Flat portion 40 is opposite to opening 13. The flat portion 40 of side wall 12 allows the holder 10 to be placed on a flat surface. This feature also allows the holder to be maintained more easily in a stable position if a user leans the holder while grating or slicing.

A window 70 is provided in the flat portion 40 of side wall 12. Window 70 is transparent, and is preferably made of a clear, rigid plastic. Window 70 is rectangular. Markings for measure are preferably provided, as shown in FIG. 5, in both cups and milliliters. Window 70 extends substantially the height of main chamber 17. As a result, a user may view accurately whether a sufficient quantity of material has been grated.

The fitting of window 70 in side wall 12 will now be described. Referring to FIG. 6, the longer sides of window 70 are provided with longitudinal slots 71, 72. The curved sections of side wall 12, and portion 40 immediately above and below window 70, are integrally constructed. It will be seen that a rectangular opening is provided in this integrally constructed piece of side wall 12. The integrally constructed piece of side wall 12 has interior sides 90, 92. Interior sides 90, 92 are provided with protruding longitudinal flanges 94, 96. Flanges 94, 96 mate with longitudinal slots 71 and 72 in window 70.

Referring to FIGS. 2 and 3, the holder 10 has side edges 22 along each edge of wall 12 and bottom edge 24 along an edge of bottom wall 18. These edges 22 and 24 are edges of the opening 13 of main chamber 17 of the hollow body 19. Projecting from the interior of wall 12 adjacent to each side 22, there are three holding protrusions 26. Each holding protrusion 26 has a substantially hemispherical cross-section, as may best be seen in FIG. 7.

In the embodiment illustrated, there are three holding protrusions 26 along each side 22 of the holder. The number of holding protrusions 26 may be varied, or a continuous protrusion may be provided, but there must be at least one such protrusion along each side 22. Also extending from the interior of wall 12, further into the interior of wall 12 than holding protrusion 26, there is a continuous supporting ledge 27.

With reference to FIG. 7, the function of the holding protrusions 26 and supporting ledge 27 may be better appreciated. Board 11 has a central portion 80 of sheet metal, and a plastic rim 42 around the sides thereof. Sheet metal portion 80 has a planar surface and four sides 44. Each of sides 44 of sheet metal portion 80 of board 11 is bent perpendicular to the flat body. Thus each side 44 is substantially planar and rectangular. Each side 44 is turned in on itself at the bottom thereof at 46. A number of circular holes 47 are provided in each side 44.

Rim 42 has a substantially rectangular cross-section. Rim 42 has a channel 50 in the exterior wall of each of its longer sides. A number of cylindrical pegs 52 depend inward from an interior wall of each of the longer sides of rim 42. Each peg 52 fits through a corresponding hole 47 in the side 44 of the sheet metal board. An inward-protruding lip 54 protrudes inward from the bottom of the interior wall of rim 42. The turned-in portion 46 abuts against an upper surface of lip 54.

When the board 11 is in position for use on the holder, holding protrusions 26 in the holder mate with channels 50 in the rim. Board 11 thus is snap-fitted on the body 10.

The combination of board and rim is sufficiently flexible that, when the board is pulled with a sufficient force from the holder, the rim will slide past the holding protrusions 26. Similarly, when the board is pushed with sufficient force, the rim will pass over the holding protrusions 26. This permits removal and insertion of a board. The flattened portion 40 of side wall 12 is opposite to the opening 13 of the hollow body. The grater holder 10 may thus rest on flattened portion 40 when the board 11 is being removed, with a minimum of spillage of food.

Figure 4:
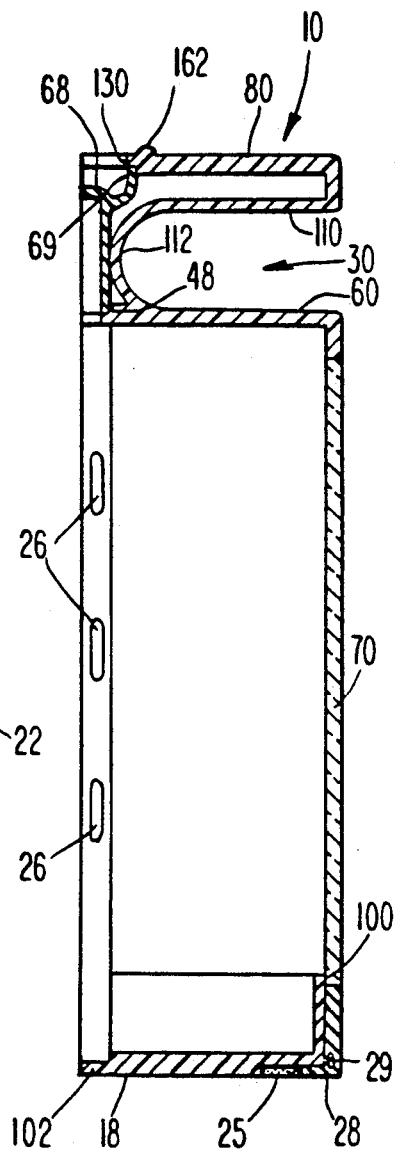
FIG. 4 is a sectional view of a holder for a grater or the like take a line 4—4 of FIG. 3.
Figure 8:
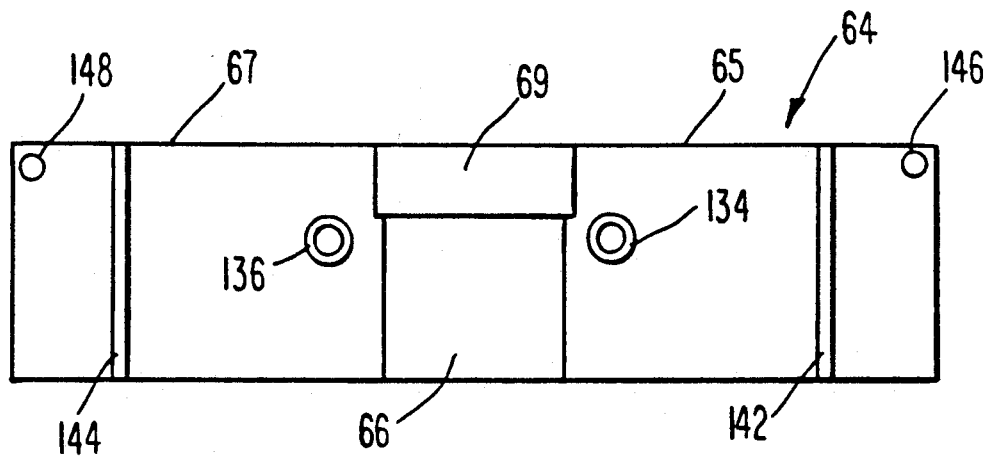
FIG. 8 is a view of a plate according to the invention from the interior of the holder.
Figure 9:
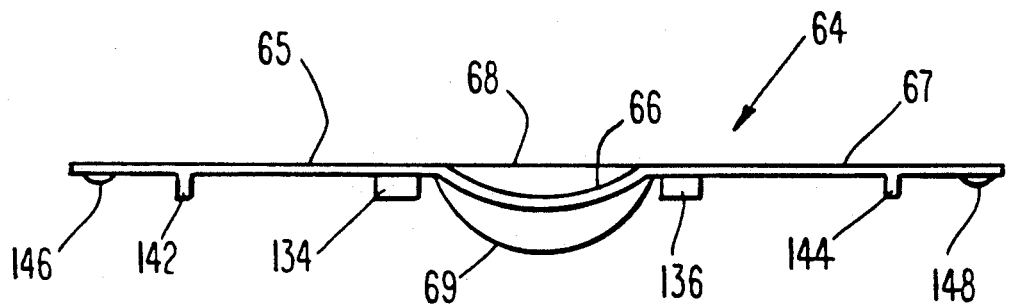
FIG. 9 is a bottom view of a plate according to the invention.
Figure 10:
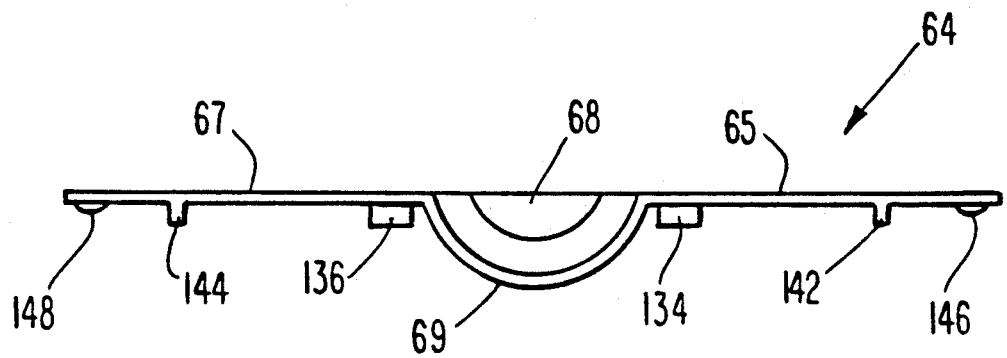
FIG. 10 is a top view of a plate according to the invention.

Referring to FIG. 4, the bottom portion 100 of sidewall 12 is recessed inward. A foot 28 is attached to the exterior surface of side wall 12 on the recessed bottom portion 100 thereof. A continuous smooth junction is thus provided on the exterior surface of side wall 12 where foot 28 abuts against the curved sections of side wall 12 and the bottom of window 70. Foot 28 is also attached about the outer portion of bottom wall 18. The foot 28 may be made of rubber or other material that has a high coefficient of friction. As shown, foot 28 extends substantially the entire circumference of the exterior surface of wall 12. Protrusion 29, extending from a lower portion of recessed bottom portion 100 of side wall 12, has flange 39 thereon. Protrusion 29 serves to keep foot 28 attached to the body. Foot 28 provides a portion of the exterior of holder 10 with a high coefficient of friction. Foot 28 is advantageous because it is then convenient for a user to rest the body 10 on foot 28 and so prevent the body 10 from sliding across a smooth surface when in use. The continuous surface of foot 28 and side wall 12 allows the holder to rest on the flat portion of side wall 12. With reference to FIGS. 2 and 4, it will be seen that bottom surface 18 has a downward-depending base 102 along edge 24, and the remainder of a lower surface thereof, except for foot 28 and a channel 25 adjacent to foot 28. Foot 28 and base 102 of bottom wall 18 provide a bottom surface on which the holder 10 may stand upright.

It will be seen that, with reference to FIGS. 1, 2, 4, and 5, in an upper portion of the holder 10, wall 12 has inward-protruding handle structure 30. Handle structure 30 serves as a handle so that a user of a holder may easily grip the holder while grating or slicing. Partition wall 60 provides a planar lower wall of structure 30. Structure 30 also has planar upper wall 110 parallel to partition wall 60, and a substantially semi-cylindrical portion 112 joining partition wall 60 and upper wall 110 of structure 30. Structure 30 is integrally formed of plastic with side wall 12.

On the interior of the body partition wall 60 extends inward from the point of attachment with semi-cylindrical portion 112. A central portion of partition wall 60 has an inward depression 62. The inner edge of partition wall 60 is notched to provide a ledge 98 on the upper part thereof, as may be seen in FIG. 4. Referring to FIG. 2, top wall 80 has vertical ribs 120, 122 and 124 on the inner side thereof. The center vertical rib 122 is shorter than ribs 120 and 124. A vertical rib 160 is provided along sidewall 12 in the interior of top chamber 15. A corresponding rib, not shown, is provided opposite on sidewall 12. With reference to FIGS. 2 and 4, a semi-circular cutout 130 is provided centrally in top wall 80. A bump 162 is provided on top of top wall 80, adjacent to cutout 130, as may be seen in FIG. 4.

With reference to FIGS. 2, 4, 8, 9 and 10, covering plate 64 is shown. Covering plate 64 has a generally rectangular planar form, with two side flat rectangular members 65, 67 and central curved section 66. Central curved section 66 has the form of substantially a section of a cylinder. An upper portion of central section 66 includes a supporting lip 69 and forward member 68. Supporting lip 69 extends upward from central section 66 into cavity 15, and has a substantially semi-circular cross section. A member 68 extends opposite from supporting lip 69 from central section 66. A central portion of member 68 is straight, and opposite side portions appear substantially semicircular when looking into the body of the holder. Covering plate 64 fits onto the top portion of the unit over top chamber 15. Side members 65 and 67 rest on ribs 120 and 124 and on rib 160 and its corresponding opposite rib. Lip 69 rests on central rib 122. Central portion 66 rests on semi-cylindrical section 112. The lower edge of plate 64 rests on ledge 98.

Plate 64 is attached to semi-cylindrical section 112 by means of screws. Two screwholes 130 and 132 are provided through semi-cylindrical section 112, with reference to FIG. 2 and FIG. 5. Screwholes 130 and 132 are contained in cylindrical bosses 131 and 133 on semi-cylindrical section 112. Blind threaded cylindrical bosses 134 and 136 depend from the side of plate 64 that abuts on semi-cylindrical section 112. Screws 138 and 140, shown in FIG. 5, have heads recessed in the surface of section 112, and extend into blind bosses 134 and 136 on plate 64.

Ribs 142 and 144 depend downward from flat sections 65 and 67, respectively, of plate 64. Protrusions 146 and 148 depend downward from the outer upper corners of plate 64. Dimples are provided in the surface of plate 64 opposite to protrusions 146 and 148.

Semi-cylindrical portion 112 has two planar support members 150 and 152 extending therefrom. Support members 150 and 152 correspond to ribs 142 and 144 of plate 64. Supporting members 150 and 152 are glued to ribs 142 and 144.

Covering plate 64 serves to prevent particles from falling into top chamber 15. It is preferably permanently attached to the body of the holder 10.

The curvature of inward depression 62 in partition wall 60 and the curvature of central portion 66 of covering plate 64 match each other. The depression 62 and central portion 66 are located adjacent a section of the board that has been removed, as shown at 36 in FIGS. 1 and 2. Thus, a user may place a finger on depression 62 and central portion 66 and under board 11 in removing board 11 from the holder.

Wall 60 is a top surface of the portion of the holder 10 that contains grated or sliced material. Thus side wall 12, partition wall 60 and bottom wall 18 form a main chamber 17 with an opening 13. Side edges 22, bottom edge 24, and an inner edge of partition wall 60 define the edges of opening 13. The board 11 fits over the opening 13 of the hollow body 19. Little or no grated material will fall out when the board is in place.

In operation, a board is placed as in FIG. 1, 6, and 7, so as to be secured in the body 10. The user grasps handle 30 by one hand, and rests a portion of foot 28 on a work surface, such as a kitchen counter. A piece of cheese or vegetable, or other item, which is desired to be grated or sliced, is moved against the grater or slicer. The particles or slices of material fall into the interior of the hollow body. As noted, the hollow body has a substantially continuous interior surface so that no material will fall out. The user may at any time set the holder upright and view the quantity of grated material through window 70. Thus the holder may be set upright for greater accuracy in estimating the quantity of material contained in main chamber 17. When the grating or slicing is complete, or the main chamber 17 is full, the use may rest the holder on flat portion 40 of side wall 12, and insert his or her finger into fingerhole 36 to remove the board. The slices or particles may then be emptied over a bowl or other receptacle. As a result, particles will not spread or be spilled over the work surface or onto the floor.

It will be appreciated that there are considerable variations that can be accomplished in an apparatus of the invention without departing from its scope. As a result, although a preferred embodiment of an apparatus of the invention has been described above, it is emphasized that the invention is not limited to a preferred embodiment and there exist alternative embodiments that are fully encompassed within the invention's scope, which is intended to be limited only by the scope of the appended claims.

What is claimed is:

1. A holder for a grater board, comprising:
   (a) a hollow body having a top wall, a bottom wall, a side wall, and an interior partition wall, said side wall, said bottom wall, and said partition wall defining a main chamber having an opening in one side thereof, said side wall having a planar portion substantially opposite to said opening in said hollow body, said bottom wall having a base providing a bottom surface on which said holder may stand upright;
   (b) securing means for removably securing a grater board to said body over said opening;
   (c) a foot made of a material having a high coefficient of friction on a lower portion of an outer surface of said side wall of said hollow body;
   (d) a handle integrally formed within an upper portion of said hollow body for an individual to grip said holder; and
   (e) a window in said side wall of said main chamber extending substantially the height thereof.

2. A holder for a grater board as recited in claim 1, wherein a portion of said opening in said hollow body is defined by edges; and said means for removably securing a grater board comprises at least two protrusions attached to and extending from substantially opposite portions of said edges of said opening.

3. A holder for a grater board as recited in claim 1, wherein said opening is substantially rectangular.

4. A holder for a grater board as recited in claim 1, wherein said foot is made of rubber.

5. A holder for a grater board as recited in claim 1, wherein said window is substantially rectangular and is located in said planar portion of said side wall.

6. A holder for a grater board as recited in claim 5, wherein said window has markings showing volume thereon.

7. A holder for a grater board as recited in claim 5, wherein a portion of said rubber foot is disposed on a lower portion of said planar portion of said sidewall, said lower portion of said sidewall being recessed, so as to provide a continuous planar surface, including said rubber foot on the exterior of said side wall.

* * * * *